UNITED STATES PATENT OFFICE.

ALBERT PIETZSCH AND GUSTAV ADOLPH, OF MUNICH, GERMANY.

ART OF MAKING HYDROGEN PEROXID.

1,063,383.     Specification of Letters Patent.     Patented June 3, 1913.

No Drawing.     Application filed October 6, 1910. Serial No. 585,570.

*To all whom it may concern:*

Be it known that we, ALBERT PIETZSCH and GUSTAV ADOLPH, citizens of Germany, residing at Munich, Bavaria, Germany, have invented certain new and useful Improvements in the Art of Making Hydrogen Peroxid; and we do hereby declare the following to be a full, clear, and exact description of the invention, such as will enable others skilled in the art to which it appertains to make and use the same.

This invention relates to the method of producing hydrogen-peroxid, the objects being to increase the yields of hydrogen-peroxid and to simplify the process.

It is well known that under certain conditions persulfuric-acid in the presence of concentrated sulfuric-acid is decomposed into hydrogen-peroxid and sulfuric-acid, the rapidity of the decomposition increasing considerably with the temperature. However, when employing this method a considerable loss of oxygen results, due to the detrimental influence of catalytic agents, this detrimental influence being particularly noted in the case of mixtures of hydrogen-peroxid and persulfuric-acid or what is known as caro-acid. These facts have been taken in account heretofore and it has been possible to produce hydrogen-peroxid solutions of 3% strength and in good yields. In carrying out these methods, persulfuric-acid is produced by electrolysis, great care being taken to avoid the action of catalytic agents. However, by these methods it has not been possible to obtain highly concentrated solutions, because the concentration of persulfuric-acid cannot be raised to much over 20% if good yields are to be obtained.

Heretofore it has not been found possible to obtain hydrogen-peroxid from persulfates. Experiments and researches made by us have shown, however, that it is possible to produce hydrogen-peroxid by the reaction of dilute sulfuric acid on persulfates. It was found, moreover, that the reaction for this purpose does not proceed as would be supposed, that is to say, in such a way that persulfuric-acid is first produced concurrently with the separation of the corresponding sulfates, this reaction being followed by the formation of caro-acid, and finally by the formation of hydrogen-peroxid. On the contrary, the experiments made by us show the reactions indicated in the following equations occur:

1. $K_2S_2O_8 + H_2SO_4 = K_2S_2O_7 + H_2SO_5$
2. $H_2SO_5 + H_2O = H_2SO_4 + H_2O_2$
3. $K_2S_2O_7 \pm H_2O = 2KHSO_4$

This discovery we have found to be of the greatest importance for the production of a concentrated solution of hydrogen-peroxid, for the reason that the sulfuric-acid from the persulfates is not liberated by the reaction, so that the concentration of the free sulfuric-acid is not changed. This is as it should be, for the concentration should be allowed to vary only within small limits, because otherwise the conversion would be effected only very slowly or not at all. When employing the above reaction, it is, therefore, possible to add any amount of persulfate to one and the same quantity of sulfuric-acid without decreasing the velocity of the reaction. It has been found that by employing this method of production, solutions of 30% strength and upward with approximately theoretical yields may be obtained. These increased yields are due, moreover, to the peculiarity of the reaction in which, as has been observed, the conversion proceeds past caro-acid, so that the reaction expressed in the following equation cannot take place:

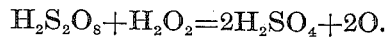

$$H_2S_2O_8 + H_2O_2 = 2H_2SO_4 + 2O.$$

As a matter of fact losses of oxygen occur only in a very small degree.

Another advantage in utilizing persulfates for this purpose resides in the fact that the same may be completely freed from catalytic agents by crystallizing the same after their production electrolytically. This, as has been already mentioned above, is of the greatest importance. The sulfuric-acid employed does not have to be purified, but it suffices to employ in our process what is known as the chemically pure sulfuric-acid of commerce. The following example serves to illustrate the manner in which the invention is carried out in its preferred form.

Example 1: 2400 grams of potassium-persulfate which may be produced by recrystallizing commercial potassium-persulfate are added to 1000 cubic centimeters of pure sulfuric-acid of commerce, diluted down to a specific gravity of 1.4, at a temperature of from 50 to 55 degrees centigrade in small quantities at a time and while continuously mixing, in such a way that the entire salt shall be added to the bath within the period of one hour. Thereupon the mixture is stirred half an hour and then cooled, whereupon the hydrogen-peroxid of 30% strength which has been formed is separated from the remaining potassium-bisulfate by siphoning or otherwise. It has been found, moreover, that the reaction can be carried out with still greater success if a mixture of sulfuric-acid and persulfate can be directly submitted to distillation at from 50° to 100° centigrade, according to the pressure employed in distilling. Under this method the active oxygen of the persulfate is immediately converted into hydrogen-peroxid which distils over, the yield being nearly theoretical, the salts employed remaining as a bisulfate, and being susceptible of being again employed for the electrolytic production of persulfate after separation from the sulfuric-acid. In this manner hydrogen-peroxid may be obtained in a continuous cyclic process without any consumption of chemicals. This manner of proceeding is particularly adapted to be employed with potassium-persulfate which is soluble with difficulty.

The method thus described has the following advantages as compared with the process already known: Under the old method persulfuric-acid is employed for the production of hydrogen-peroxid. The persulfuric-acid for this purpose is obtained either by electrolysis of sulfuric-acid, having a specific gravity of 1.4, or by treating persulfates with sulfuric acid. The persulfuric acid, after formation, is heated to 50 degrees centigrade and thus transformed into hydrogen-peroxid, or it is directly submitted to distillation or extraction under the influence of heat, in which case also hydrogen-peroxid is obtained. If under this old method the solutions should not be completely pure and free of catalyzing agents, considerable losses of oxygen result by decomposition. Under these circumstances the direct decomposition of persulfuric acid, caro-acid or hydrogen-peroxid takes place, or, in particular, a decomposition according to the following equations:

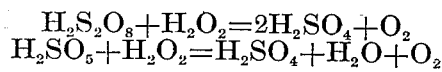

It is notable that in this method the entire amount of active oxygen furnished enters the retort as a constituent of compounds which are readily decomposable and which react upon each other in such a way as to liberate oxygen. This results in a strongly reduced yield of the process of distillation.

Moreover, it is to be observed that persulfuric acid can be obtained electrolytically only in such a way as to yield from 1.5 to 2% of active oxygen, as otherwise the current-efficiency would become too low. It follows from this that the entire apparatus for distillation must be arranged to receive large volumes of the reagents, which makes the process very difficult, in view of the fact that only clay and porcelain vessels whose size is necessarily limited can be utilized. Contrasted with this our method which consists of submitting a mixture of persulfate and sulfuric-acid to distillation presents, in the first place, the great advantage that the active oxygen employed is obtained in the retort from a persulfate which is decomposable with difficulty. In this way no losses in oxygen result by reason of heating, even in the presence of considerable quantities of catalytic agents. This, for the reason that by the continual distilling off of the generated hydrogen-peroxid the active oxygen of the persulfate enters into the formation of hydrogen-peroxid almost instantly and this hydrogen-peroxid is immediately removed by evaporation so that neither persulfuric-acid, caro-acid or hydrogen-peroxid remains in solution in any appreciable quantity. Decomposition, as in the old process, is, therefore, impossible. The mixture also shows a considerable resistance to high temperatures. For example, solutions containing catalytic agents may be brought to a temperature of 95 degrees without detriment. It is, moreover, to be remarked that under our process it is not necessary to start with sulfuric-acid of a specific gravity of 1.4, but the distillation may be effected equally as well with sulfuric-acid having a specific gravity of 1.5 or 1.6 or even higher. This is a fact which has been discovered by us and it is contrary to all that was supposed to be the case according to former knowledge and experiments. This fact is of very great importance, for the reason that due to it we may obtain hydrogen-peroxid of any desired degree of concentration, for the reason that the higher the specific weight of the sulfuric-acid the more concentrated is the product of distillation. For example, from sulfuric-acid having a specific weight of 1.4, hydrogen-peroxid of 10% strength distils over; from sulfuric-acid having a specific weight of 1.7, a hydrogen-peroxid solution of 25% strength, and so on.

The quantity of sulfuric-acid employed for a given quantity of hydrogen-peroxid under our process is only ⅕ of that employed in processes based on the use of persulfuric-acid. It is surprising to note that the distillation takes place in a perfect manner without splashing or bumping if the salt is added to the sulfuric-acid in a manner to form with the latter a thick paste or sludge. For example, 2 kilograms of persulfate or more may be added to one liter of sulfuric-acid in the retort with good results in this direction. The mass so formed contains 120 grams of active oxygen, while a 21% persulfuric-acid, for example, contains only 24 grams of active oxygen.

Our process is even adapted to be carried on continuously if a salt separator is applied to the retort from which the bisulfate obtained is taken, a corresponding quantity of fresh salt being added to the retort. With a certain quantity of sulfuric-acid it is thus possible, under our process to convert any quantity of persulfate into hydrogen-peroxid, it being, however, necessary for this purpose to introduce water continuously into the retort during the distillation and in quantities governed by the extent to which the hydrogen-peroxid distils over and sufficient to maintain the original degree of concentration of the sulfuric-acid. The process, therefore, essentially consists in oxidizing the water by persulfate to hydrogen-peroxid, the persulfate being transformed into bisulfate which in turn may be afterward regenerated to persulfate by electrolysis. This process enables us to obtain, without any practical loss, electrolytically active oxygen in the form of hydrogen-peroxid of any desired degree of concentration. With a retort of a capacity of 200 liters, 600 kilograms of hydrogen-peroxid of 25% strength or 5000 kilograms of 3% strength may be produced in 10 hours. The product obtained is chemically pure and stable.

In comparison with the first described method the direct distillation is of greater simplicity and leads to better yields as has already been set forth, for the reason that, among other things, decomposable combinations of oxygen are dissolved only in small quantities in the retort, whereas in the formerly practised process great quantities of caro-acid come into contact with hydrogen-peroxid.

The following will serve as an example of my process when carried out as a distillation process.

Example 2: 1500 grams of potassium-persulfate are added to 1 liter of sulfuric-acid having a specific gravity of 1.6. The mixture is then submitted to distillation in a vacuum at a temperature of 80 degrees centigrade. During the distillation water is gradually and continuously introduced into the retort, the total amount of water thus added being 730 grams. By this process 182 grams of hydrogen-peroxid distils over in the form of a 20% solution.

What we claim and desire to secure by Letters Patent is:

1. The process of producing hydrogen peroxid, which consists in reacting on a purified persulfate with diluted sulfuric acid and heating the mixture.

2. The process of producing hydrogen peroxid, which consists in reacting on a purified persulfate with diluted sulfuric acid and heating the mixtures until all of the active oxygen of the persulfate has been converted into hydrogen-peroxid.

3. The process of producing hydrogen-peroxid, which consists in mixing a solid persulfate with sulfuric acid and subjecting the mixture to distillation.

4. The process of producing hydrogen-peroxid, which consists in mixing a solid persulfate with sulfuric-acid and subjecting the mixture to distillation, water being added as the distillation proceeds.

In testimony whereof we hereunto affix our signatures in the presence of two witnesses.

ALBERT PIETZSCH.
GUSTAV ADOLPH.

Witnesses:
  A. Vere W. Cotter,
  Mathilde K. Held.